United States Patent [19]
Perrine

[11] Patent Number: 4,971,096
[45] Date of Patent: Nov. 20, 1990

[54] WING FOLD FRANGIBLE VALVE

[75] Inventor: Neill D. Perrine, Jackson, Mich.

[73] Assignee: Aeroquip Corporation, Jackson, Mich.

[21] Appl. No.: 418,239

[22] Filed: Oct. 6, 1989

[51] Int. Cl.⁵ ............................................. F16K 17/40
[52] U.S. Cl. .................... 137/68.1; 137/614; 137/614.03; 285/2
[58] Field of Search ............... 137/68.1, 614, 614.02, 137/614.03; 285/2

[56] References Cited

U.S. PATENT DOCUMENTS

| | | | |
|---|---|---|---|
| 4,269,226 | 5/1981 | Allread | 137/614 |
| 4,301,823 | 11/1981 | Meisenheimer, Jr. | 137/68.1 |
| 4,328,822 | 5/1982 | Wilhelm | 137/68.1 |
| 4,351,352 | 9/1982 | Meisenheimer, Jr. | 137/68.1 |
| 4,376,445 | 3/1983 | Meisenheimer, Jr. | 137/68.1 |
| 4,614,201 | 9/1986 | King et al. | 137/68.1 |
| 4,625,746 | 12/1986 | Calvin et al. | 137/68.1 |
| 4,643,216 | 2/1987 | Allread et al. | 137/68.1 |
| 4,884,591 | 12/1989 | Webster | 137/68.1 |

*Primary Examiner*—John Rivell
*Attorney, Agent, or Firm*—Beaman & Beaman

[57] ABSTRACT

A reconnectable frangible coupling wherein at least one coupling part includes an operating valve and a safety valve. The operating valve utilizes the relative axial movement of the coupling parts during coupling and uncoupling to open and close, respectively, and the spring biased safety valve is engaged and retained in an open position by a valve retainer interposed between the valves. Frangible portions maintain the valve retainer in engagement with the safety valve and upon the coupling being subjected to severe impact, such as an aircraft crash, the frangible portions fracture permitting the valve retainer to disengage from the safety valve allowing the safety valve to close.

9 Claims, 2 Drawing Sheets

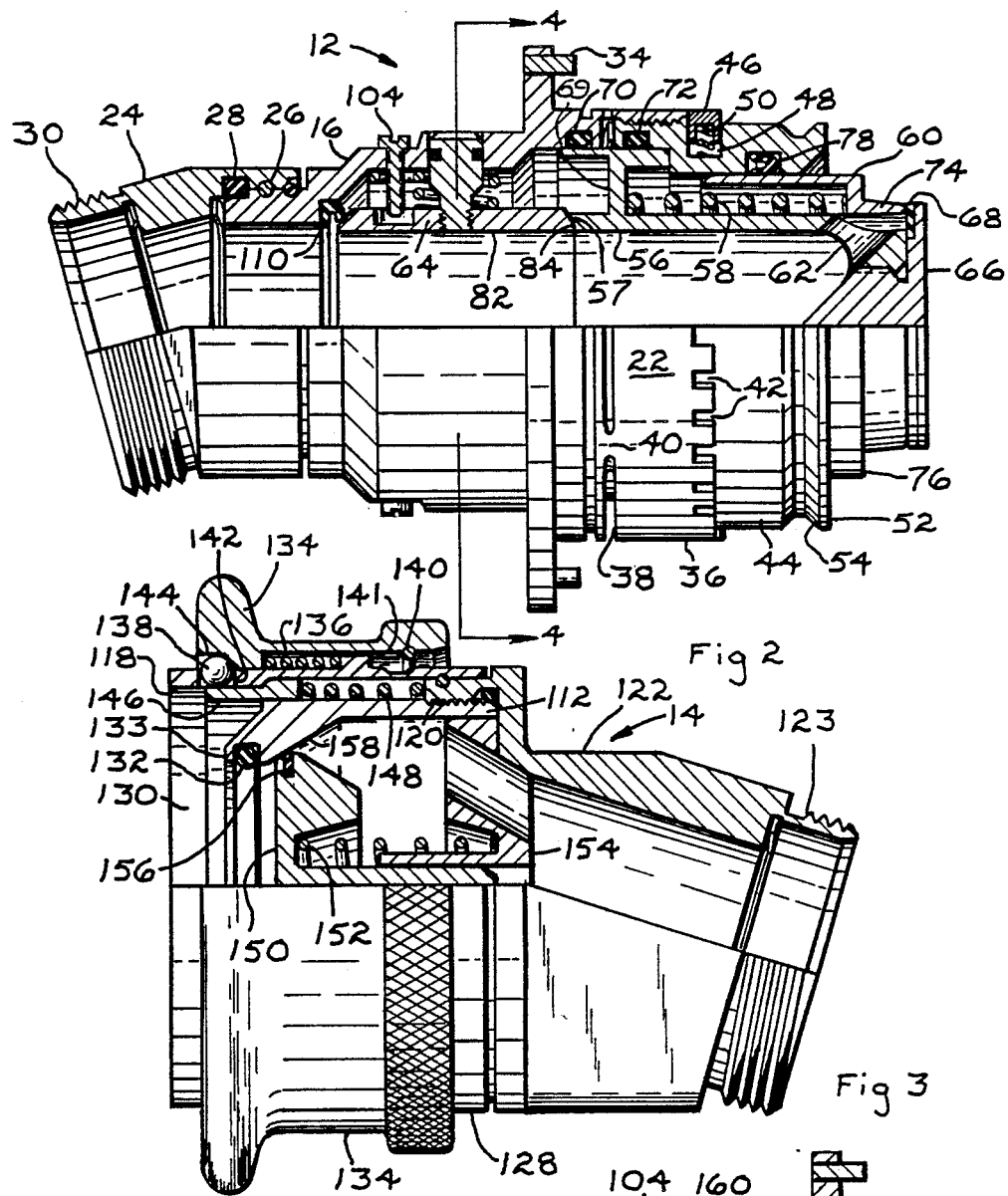
Fig 2
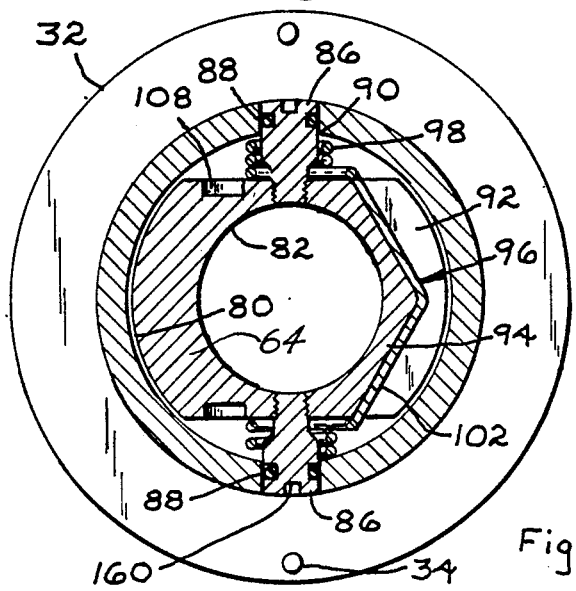
Fig 3
Fig 4
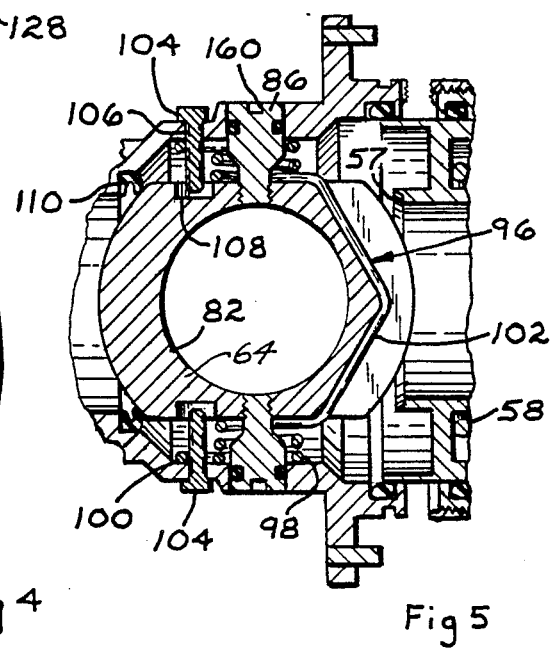
Fig 5

WING FOLD FRANGIBLE VALVE

BACKGROUND OF THE INVENTION

In fluid systems for aircraft, race cars, and in other applications where spillage of inflammable fuel or liquid may occur due to high impact forces being imposed upon the vehicle it is known to employ "crashworthy" couplings. Such couplings include frangible structure for interconnecting the valve bodies, and usually, the frangible structure is defined by weakened pins or portions utilized in the coupling interlocking components. In the event of a crash, high tension or bending forces applied to the coupling parts causes the weakened portions to fracture permitting the coupling halves to separate. Usually, each coupling half or part includes a self-sealing valve which is maintained in its open position when the coupling is in its normal operating mode. However, upon the coupling halves separating spring forces imposed upon the valves bias the valves to the closed condition preventing fluid flow and leakage from the associated conduit, such as a hose line as shown in the assignee's U.S. Pat. No. 4,643,216.

While crashworthy couplings of the aforedescribed type have proven to be dependable in operation they are not readily connectable and usually require a separate tool, such as a screwdriver or mandrel, to hold the valves in the open position as the parts are being connected until the parts are fully coupled as in the case with the assignee's Ser. No. 07/239,408, filed Sept. 1, 1988, now U.S. Pat. No. 4,884,591. This creates an inconvenience for the operator especially in situations where it is often necessary to disconnect and reconnect the coupling parts, such as when the parts are located in the wings of aircraft and must be disconnected in order to fold the wings for storage purposes.

It is an object of the invention to provide a reconnectable self-closing frangible fluid system coupling wherein the coupling parts may be quickly connected or disconnected without the use of separate tools.

A further object of the invention is to provide a reconnectable frangible fluid system coupling including a pair of coupling parts wherein at least one of the parts include frangible components and employs an operating valve and a safety valve, the operating valve utilizing the relative axial movement of the coupling part during assembly and disassembly to open and close respectively, and the safety valve being retained in an open position by valve retaining structure interposed between the two valves whereby upon fracture of the frangible components the safety valve will close automatically sealing the part to prevent spillage of fluid.

Yet another object of the invention is to provide a reconnectable frangible fluid coupling wherein at least one of the parts includes a safety valve which will close automatically upon fracture of the coupling sealing the coupling part's passage, yet the construction of the safety valve is such that it produces no flow restrictions in the coupling part when it is in the open position.

A fluid coupling in accord with the invention basically consists of two interconnectable parts each having a passage extending therethrough and each having a conduit attachment end for communication with a fluid source such as a hose, conduit tank, or the like, and a coupling end for coupling to one another. Each part is provided with an operating valve located within the associated passage adjacent the coupling end which engages a fixed member of the opposing part to open when fully coupled, and each operating valve has a compression spring biasing it to the closed position thereby sealing the associated passage automatically during uncoupling.

At least one of the parts also employs a safety valve in accord with the invention located intermediate the conduit attachment end and the coupling end. In the disclosed embodiment the safety valve is of a rotary ball valve type having a diametrical bore substantially equal in diameter to that of the passage. The safety valve is normally biased toward a closed position by a spring, but is retained in an open position by engagement with a valve retainer interposed between the safety valve and the operating valve whereby the bore is axially aligned with the passage such that the safety valve produces no flow restriction in the coupling part.

The valve retainer is maintained in engagement with the safety valve by releasable interlocking frangible structure which includes a fixed portion which engages and displaces the opposing parts operating valve to the open position upon coupling of the parts. Under normal operating conditions the frangible interlocking structure is of sufficient strength to maintain the valve retainer in engagement with the safety valve, but upon exceptional bending or tension forces being applied to the coupling the frangible structure will fracture permitting the valve retainer to separate from the safety valve and the safety valve to close. At the same time the valve retainer will also separate from the opposing part's operating valve permitting the operating valve to bias to its closed position.

The coupling parts utilize standard connecting means in which an annular sleeve mounted on one part supports radially displaceable detents that engage in a recess in the opposing part to interlock the parts in aligned axial communication. Thus, the coupling parts may be quickly and easily connected or disconnected with minimal fluid loss while the safety valve remains in an open position. Yet, upon fracture of the coupling frangible structure the safety valve will close to prevent fluid spillage.

If desired, the frangible interlocking structure may be released without damaging the coupling for testing purposes to insure that the safety valve is operating and will rotate to the closed position in the event of impact and fracture of the frangible components.

BRIEF DESCRIPTION OF THE DRAWINGS

The aforementioned objects and advantages of the invention will be appreciated from the following description and accompanying drawings wherein:

FIG. 2 is an elevational, partially sectional, view of the male coupling part of FIG. 1, the safety valve being illustrated in the open position and the operating valve in the closed position, FIG. 3 is an elevational, partially sectional, view of the female coupling part of FIG. 1 illustrating its operating valve in the closed position, FIG. 4 is an elevational, sectional, diametrical, view taken along Section 4—4 of FIG. 2, and FIG. 5 is a detail, sectional view of the coupling part of FIG. 2 illustrated during the initial stages of separation upon fracture of the frangible webs, the safety valve being shown in the closed position.

DESCRIPTION OF THE PREFERRED EMBODIMENT

Figure 1:
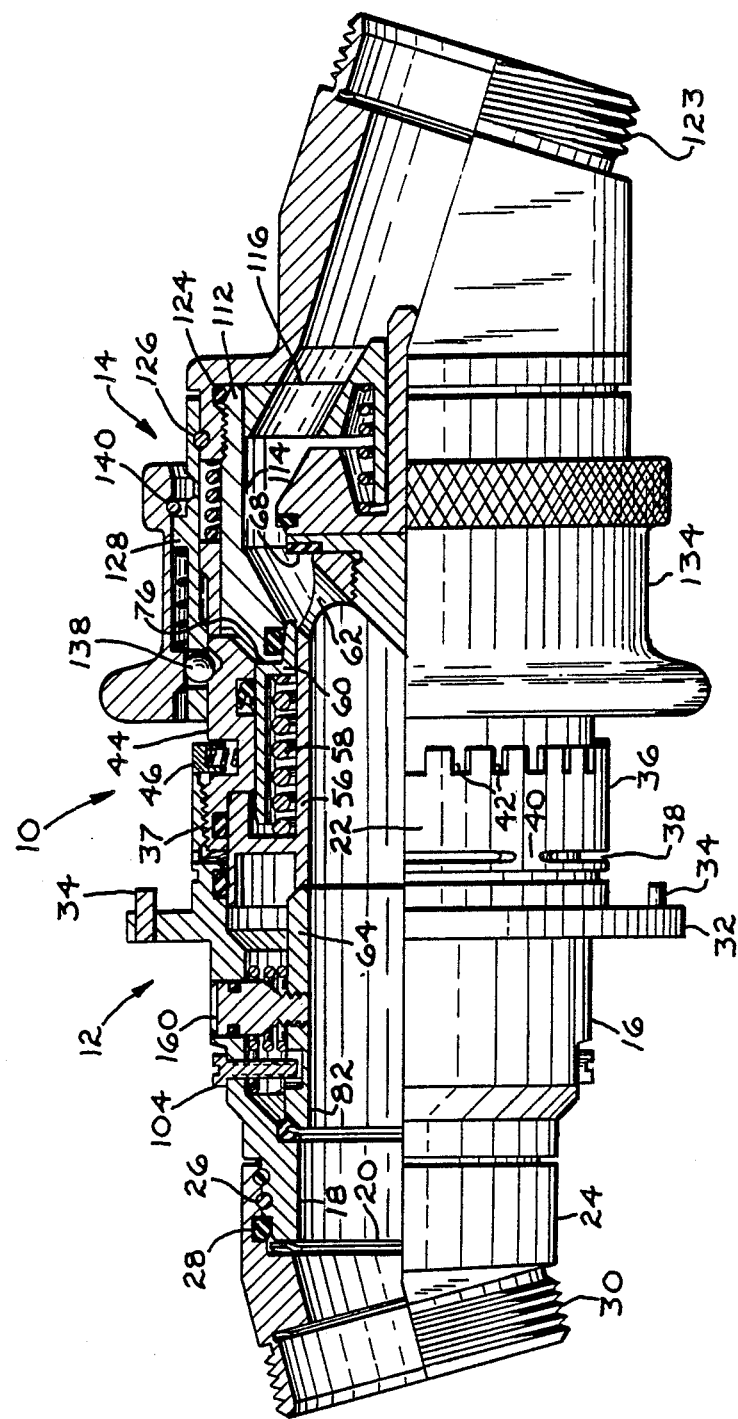
FIG. 1 is an elevational, partially sectional, view of a reconnectable, frangible valve coupling constructed in accord with the invention illustrated in the operating condition.

With reference to FIGS. 1-5, a typical coupling utilizing the inventive concepts of the invention is illustrated, such coupling being of the type incorporated into a flexible hose fuel line system.

The coupling 10 includes coupling parts 12 and 14 each having an axial flow passage extending between a conduit attachment end for connecting to their respective fluid conductors, not shown, and a coupling end for coupling to one another. Each part employs an operating valve located within the associated passage which utilizes the relative axial movement of the coupling parts during assembly or disassembly to open or close, respectively. The part 12 also employs a safety valve in accord with the invention which is retained in an open position by a valve retainer interposed between the safety valve and operating valve. Upon severe impact to the coupling 10 frangible portions defined on the part 12 fracture permitting the valve retainer to separate from the safety valve allowing the safety valve to close automatically due to spring forces to prevent the spillage of fluid.

The male part 12 consists of an annular body 16 having an axially extending passage 18, and the passage intersects a conduit attachment end 20 and a frangible end 22. At the conduit attachment end the body 16 is provided with an externally threaded adapter 24 which employs a drive wire 26 located within a groove to mount the adapter on the associated body, and the adapter is sealed to the associated body by an O-ring 28. A conventional hose fitting, not shown, is threadedly mounted upon the adapter threads 30. Adjacent the frangible end 22 a radially extending shoulder 32 is provided with pins 34 for mounting the part 12 to a support or bulk head, not shown, and an annular circumferential axially extending projection 36 extends from the radial shoulder 32 of the part 12. The projection 36 is internally threaded at 37 and is provided with a plurality of slots 38 which extend through the radial thickness of the projection. The slots are not circumferentially continuous as to intersect each other, but rather are interrupted at several locations to provide a plurality of weakened webs 40, and the webs 40 form frangible portions in the frangible end 22. The end of the projection 36 is provided with a plurality of recesses 42 having a generally rectangular configuration.

An annular adapter 44 is threadedly mounted to the projection 36 at threads 37 and is provided with a pair of diametrically opposed safety lock detent pins or buttons 46 each received within a recess 48. The pins 46 are biased outwardly by a compression spring 50, and stop means, not shown, limit the outward movement of the detent pins. The pins 46, in their outward position as shown in FIGS. 1 and 2, are in a lock position receivable within a recess 42, the pins being of a configuration complementary to the recesses 42. By manually depressing the detent pins inwardly out of alignment with the recesses 42 rotation between the body 16 and adapter 44 may occur.

The adapter 44 has an extension end 52 capable of being introduced axially into the coupling end of the female part 14 whereby an annular recess 54 receives detents mounted on the part 14 to maintain the coupling parts in locking engagement. The adapter 44 supports a valve assembly within the passage 18 comprising a tubular valve retainer 56, a spring 58 and an annular movable valve sleeve or operating valve 60 which circumscribes one end of the valve retainer 56 adjacent ports 62 defined in the retainer and the other end of the valve retainer defines an abutment edge 57 which engages a safety ball valve 64. A cap 66 is threadedly mounted to the valve retainer 56 in the end adjacent the ports 62 and supports an annular seal 68. The valve retainer 56 also includes a radially extending shoulder 69 having a T-shaped cross-section which engages O-rings 70 and 72 to seal the valve retainer 56 to the body 16 and adapter 44.

The operating valve 60 is axially moveable between open and closed positions and includes a circumferential axially extending projection 74 which extends from a circumferential abutment edge 76. The spring 58, which is interposed between the valve retainer 56 and operating valve 60, is engaged at one end by the shoulder 69 and normally biases the valve to the closed position, FIG. 2, whereby the projection 74 engages the annular seal 68 sealing the ports 62. Movement of the valve 60 is limited to the closed position of FIG. 2 by engagement of the annular projection 74 with the seal 68, and the exterior surface of the valve 60 is sealed to the adapter 44 by a seal 78 disposed in an annular grove defined in the adapter 44. The valve 60 is displaced to the open position, FIG. 1, during coupling of the parts 12 and 14 by engagement of the abutment edge 76 with a fixed member defined on the female part 14.

The safety ball valve 64 is rotatably supported in the passage 18 between the conduit attachment end 20 and the operating valve 60. The safety valve 64 is of an external generally spherical configuration having an outer spherical surface 80, and a diametrical bore 82 extends through the valve defining a flat intersection 84 at the surface 80 and the diameter of the bore is substantially equal to the diameter of the passage 18 as will be appreciated from FIG. 1. The safety valve 64 is mounted on a pair of pivot pins 86 having an coincidental axis diametrical to the valve and at right angles to the valve bore 82. Each pivot pin may be received within a threaded hole in the associated valve and includes an O-ring 88 associated with a bore 90 defined in the associated coupling part body wherein the valve will be rotatably supported within the valve body 16 in a manner appreciated form the drawings.

The safety valve 64 is externally notched at 92 forming a V-shaped notch surface 94, FIGS. 4 and 5, and as will be appreciated from FIGS. 4 and 5, the notch 94 intersects the spherical surface 80 of the valve. A torsion spring 96 at each end includes a coil 98, a tail 100, and the central portion 102 is of a V-configuration corresponding to the notch surface 94. Thus, it will be appreciated that the spring coils 98 may circumscribe the valve pins 86 while the central portion 102 is totally received within the notch 92 as will be appreciated from FIGS. 4 and 5.

A stop screw 104 is received within a threaded hole 106 in the body adjacent each of the pin bores 90 which extends toward the valve 64. Adjacent each pivot pin 86 the valve 64 is provided with an arcuate slot 108, FIGS. 1, 2, 4 and 5, which receives the end of a screw 104, FIGS. 1, 2 and 5. The ends of the slots 108 define abutments for engagement with the ends of the screw 104 to restrict rotation of the valve 64 to 90° wherein engagement of the screw with one end of the slot aligns the valve bore 82 with the axis of the body, while engagement of the screw with the other end of the slot locates the valve bore 90° with respect to the body axis as shown in FIG. 5. The spring coil tails 100 engage the screws 104 thereby fixing the coils against rotation, and initially, the spring coils 98, screws 104 and tails 100 are assembled such that a biasing rotative force is imposed on the associated valve 64 tending to rotate the valve to its closed position as shown in FIG. 5. The fact that the force exerted on the valve by the spring 96 is located at the notch 92 permits high torque forces to be created.

Annular resilient seal 110 located within the passage 18 utilizes lips to produce a sealed relationship with the spherical valve surface 80 and the seal 110 provides the desired sealed relationship at both the open and closed valve positions.

The valve retainer end 57 engages the exterior surface of the valve 64 at the intersection 84 of the valve bore, and the valve retainer will prevent rotation of the valve and maintain the valve 64 in the open condition shown in FIGS. 1, 2 and 4.

The female coupling part 14 consist of an annular body 112 having an axially extending passage 114, and the passage intersects a conduit attachment end 116 and a coupling end 118. At the conduit attachment end 116 the body is provided with external threads 120 for threadedly mounting an adapter 122 to the body 112, and the adapter is provided with external threads 123 whereon a conventional hose fitting, not shown, is threadedly mounted. The adapter is sealed to the body 112 by a O-ring 124 and also employs a drive wire 126 located within a groove to rotatably mount an annular sleeve 128 to the body 112 and adapter 122.

The coupling end presents an opening 130 for receiving the part 12 whereby an O-ring 132 located in an annular groove defined in the body 112 adjacent an abutment edge 133 establishes a sealing relationship with the outer surface of the projection 74 of the part 12. A manually displaceable sleeve 134 is slidably mounted on the sleeve 128 adjacent the coupling end and is moveable by an applied force in the axial direction between open and closed positions. The manually displaceable sleeve 134, biased to the closed position of FIG. 1 by a compression spring 136 interposed between the sleeves 128 and 134, supports radially displaceable detents 138 which comprise arcs, but which could be in the form of balls, which form an interlocking engagement with the recess 54 of the part 12, and movement of the sleeve is limited to the closed position by engagement of a wire 140, mounted on the sleeve 134, with a radially extending abutment edge 141 defined on the sleeve 128.

The arcs 138 are disposed in slots 142 defined in the sleeve 128, and the sleeve 134 has a counter bore 144 that frees the arcs 138 when the sleeve 134 is in the open position of FIG. 3. A keeper sleeve 146 axially moveable between lock and release positions also supports the balls 138 within the slots 142. The keeper sleeve 146 is normally biased to the lock position of FIG. 3 by a compression spring 148 interposed between the sleeve 128 and body 112 and supported at one end by the adapter 122. The keeper sleeve 146 is displaced to the release position, FIG. 1, during coupling of the parts 12 and 14 by engagement of the sleeve 146 with the extension end 52 of the part 12 allowing the balls to drop into the recess 54.

A valve assembly located within the passage 114 comprises an axially displaceable valve 150, a compression spring 152 and a valve guide 154. The valve 150, which carries an annular sealing ring 156, is axially displaceable between open and closed positions and is normally biased to the closed position of FIG. 3 by the action of the spring 152 wherein the sealing ring 156 engages a conical valve seat 158 defined on the interior of the body 112 producing a sealed relationship. The guide 154 supports one end of the spring 152 and maintains axial alignment of the valve 150 within the passage 114.

To connect the coupling body parts 12 and 14 together it is merely necessary to insert the extension end 52 of the part 12 into the opening 130 of the part 14. By sliding the opening 130 over the part 12 the keeper sleeve 146 engages the extension end 52 displacing the sleeve 146 to the release position of FIG. 1 and as sliding continues movement is limited and the arcs 138 drop into the recess 54 whereupon the stressed spring 136 retracts biasing the sleeve 134 to the closed position of FIG. 1 preventing the detents 138 from disengaging the recess 54 interlocking the parts together.

During coupling, the cap 66 of the part 12 engages and displaces the valve 150 of the part 14 while the abutment edge 133 of the part 14 engages the abutment edge 76 displacing the valve 60 of the part 12. This will cause the valves 60 and 150 to be moved to the opened position against the action of their springs 58 and 152, respectively. Opening of the valves 60 and 150 places the axial passages 18 and 114 in fluid communication, and the coupled position of the body parts is illustrated in FIG. 1.

To disconnect the coupling 10, the manual sleeve 134 is moved in an axial direction away from the part 12 and at the same time pulling the part 14 in the same direction will disengage the detents 138 uncoupling the body parts 12 and 14. Simultaneously, the valves 60 and 150 will automatically close by the action of the springs 58 and 152, respectively, sealing the passages 18 and 114 in the uncoupled body parts.

When the parts are in the operative position of FIG. 1, and flexible hose or other conduits, not shown, are connected to the adapters 24 and 122, fluid may flow through the coupling. Upon sufficient tensile or bending forces being imposed on the coupling 10 the webs 40 will fracture, as shown in FIG. 5, and the coupling parts 12 and 14 will begin to separate as illustrated. Such separation releases the engagement of the valve retainer 56 from the safety valve 64 permitting the spring 96 to bias the safety valve 64 to the closed position as shown in FIG. 5, and the rotation of the valve will cease when the valve bore 82 is perpendicular to the axis of the body part 12 due to the engagement of the screws 104 with the end of the slots 108. This rotation of the valve to the closed position of FIG. 5 seals the coupling part 12 to prevent loss of fluid from the part.

Upon fracture of the webs 40, as the valve retainer 56 separates from the valve 60 the cap 66 also separates from the valve 150 of the part 14 whereby the action of the spring 152 forces the valve 150 to its closed position of FIG. 3 sealing the passage 114 to prevent loss of fluid from the part 14.

When the part 12 has been in service for some time it is desirable to test the safety valve for operability. Such testing may be readily achieved by disconnecting parts 12 and 14, removing the hose or conduit from the part 12, depressing the detent pins 46 from their associated recesses 42, and rotating the body 16 and adapter 44 of the part 12 relative to each other to disengage the threads at 72. This permits nondestructive separation of the body 16 and adapter 44 and permits the valve to pivot to it closed position permitting the operator to inspect the condition of the coupling and its components.

The frangible part 12 may then be reassembled by pivoting the valve 64 to its open position, which may be accomplished by use of a screwdriver engaging the slot 160 in the ends of the pins 86, and after the valve retainer 56 is positioned as desired, a mandrel, not shown, is inserted through the bores of the adapter valves and valve retainer to maintain alignment and position of the components as the body 16 and adapter 44 are mated at the threads 72. During such threading operation the safety lock detent pins 46 are manually depressed into their associated recesses 48, and upon the body 16 and adapter 44 being fully connected the detent pins 46 are released so as to be received within a recess 42 preventing rotation between the body 16 and adapter 44. The engagement of the end of the valve 64 with the valve retainer produces some sealing and O-rings 70 and 72 engaging the shoulder 69 establish a fluid-tight relationship between the body 16 and adapter 44.

The fact that the coupling 10 utilizes a sleeve and detent assembly to interlock the parts together and self-sealing valves, permits the parts 12 and 14 to be quickly connected and disconnected with minimal fluid loss as the safety valve 64 is retained in an open position such that it produces no flow restrictions in the coupling. However, in the event of severe impact imposed on the coupling, such as an aircraft crash, the safety valve will close automatically to prevent fluid spillage.

It is to be appreciated that various modifications to the inventive concepts may be apparent to those skilled in the art without departing from the spirit and scope of the invention.

I claim:

1. A reconnectable, frangible, dual valved coupling part, comprising, in combination, a tubular body having an axial flow passage, a fluid conduit attachment end and a connecting end for connection to another coupling part, means defined on said body adjacent said connecting end for releasably connecting said body to another coupling part, an operating valve located within said passage adjacent said connecting end having an open position and a closed position sealing said passage, a safety valve located in said passage intermediate said attachment end and said operating valve having an open position and a closed position sealing said passage, spring means biasing said safety valve toward its closed position, valve retaining means defined on said body between said safety and operating valves, frangible portions defined on said coupling part between said safety and operating valves supporting said retaining means on said body to retain said safety valve in said open position and releasing said safety valve for movement to said closed position upon fracture of said frangible portions.

2. In a reconnectable, frangible, dual valved coupling part as in claim 1, said frangible portions including manual operable release means permitting said safety valve to be biased to its closed position without fracturing said frangible portions.

3. A reconnectable, frangible, dual valved coupling part, comprising, in combination, a tubular body having an axial flow passage, a fluid conduit attachment end and a connecting end for connection to another coupling part, means defined on said body adjacent said connecting end for releasably connecting said body to another coupling part, an operating valve located within said passage adjacent said connecting end having an open position and a closed position sealing said passage, first spring means biasing said operating valve to its closed position, a safety valve located in said passage intermediate said body ends having an open position and a closed position sealing said passage, second spring means biasing said safety valve to its closed position, a valve retainer interposed between said safety valve and said operating valve adapted to releasably engage and retain said safety valve in said open position, and frangible valve retainer support means defined on said coupling part maintaining said valve retainer in engagement with said safety valve, said frangible valve retainer support means fracturing upon impact permitting said valve retainer to disengage said safety valve allowing said safety valve to be biased to its closed position.

4. In a reconnectable, frangible, dual valved coupling part as in claim 3, said frangible valve retainer support means including manual operable release means permitting said safety valve to be biased to its closed position without fracturing said frangible valve retainer support means.

5. In a reconnectable, frangible, dual valved coupling part as in claim 3, said safety valve comprising a spherical ball valve having a bore coaxially aligned with said passage in said open position, said bore being of a diameter substantially equal to the diameter of said passage.

6. In a reconnectable, frangible, dual valved coupling part as in claim 5, said valve retainer comprising a tubular body having ends, one of said ends defining an abutment end adapted to engage said safety valve to retain said safety valve in said open position.

7. In a reconnectable, frangible, dual valved coupling part as in claim 6, flow openings defined in the other end of said valve retainer, said operating valve comprising an axially moveable sleeve mounted on said valve retainer other end, said operating valve sealing said flow openings when said operating valve is in its closed position.

8. A reconnectable, frangible, valved coupling comprising, in combination, first and second coupling parts each having an axial flow passage extending therethrough, each part having a conduit attachment end and an open end communicating with the associated passage, connection means defined on said parts adjacent said open ends for selectively connecting said parts' open ends in coaxial communication, an operating valve located in each part passage adjacent the associated parts' open ends having an open position and a closed position sealing the associated passage, first spring means biasing each operating valve toward its closed position, each operating valve engaging a member of the opposing part to open when said parts are fully connected, at least one of said parts including a safety valve located intermediate the associated body conduit attachment end and the associated operating valve having an open position and a closed position, second spring means biasing said safety valve toward its closed position, a valve retainer defined on said one part interposed between said safety valve and its associated operating valve adapted to releasably engage and retain said safety valve in said open position, and frangible valve retainer support means defined on said one coupling part maintaining said valve retainer in engagement with said safety valve, said frangible valve retainer support means fracturing upon impact permitting said valve retainer to disengage from said safety valve allowing said safety valve to be biased to its closed position.

9. In a reconnectable, frangible, valved coupling as in claim 8, said valve retainer comprising a portion adapted to engage and displace the opposing coupling parts' operating valve to its open position, said valve retainer portion disengaging said opposing coupling parts' operating valve upon fracture of said frangible valve retainer support means permitting said opposing coupling parts' operating valve to move to its closed position.

* * * * *